Patented Dec. 6, 1949

2,490,231

UNITED STATES PATENT OFFICE 2,490,231

COATED ABRASIVE

Norman P. Robie and Albert L. Ball, Niagara Falls, N. Y., assignors to The Carborundum Company, Niagara Falls, N. Y., a corporation of Delaware No Drawing. Original application May 20, 1940, Serial No. 336,212. Divided and this application September 3, 1942, Serial No. 457,174

22 Claims. (Cl. 51—301)

This invention relates to the production of abrasive articles and more particularly to the production of flexible abrasive articles such as abrasive paper, cloth and the like, and has as an object the production of improved articles of this type.

Hitherto in the process of manufacturing such articles by affixing an abrasive coating on backings such as those made of paper and/or cloth, it has been customary to use glue or varnish as the adhesive. More recently there have been used as adhesives various synthetic resins as solutions in organic solvents or in liquid form. Such resins are, however, expensive and other adhesives have been desired.

In accordance with our invention we provide as adhesives, for use in the production of flexible abrasive articles, soluble silicate solutions which may be used alone or in various combinations with other materials to produce novel effects and which will permit the production of flexible abrasive articles having hitherto unknown and improved characteristics.

Flexible abrasive articles are usually constructed by applying to a backing, which may be paper, cloth or a composite sheet of both paper and cloth, a layer of adhesive usually known as the making coat. Abrasive grain, such as particles of garnet, alumina, silicon carbide or the like or mixtures of these, is then applied to this making coat and another application of adhesive known in the art as a sizing coat is thereupon applied.

In accordance with the present invention we have used, as an adhesive for the above-mentioned uses, soluble silicate solutions. As an example, we have found that sodium silicate solutions which have a specific gravity of about 1.68 and a $Na_2O:SiO_2$ molecular ratio of about 1:2 are useful for this purpose. Solutions of sodium silicates of other molecular ratios can also be used to good advantage with proper adjustment of the specific gravity and viscosity of the solutions for this and other purposes. These solutions may be prepared from a single silicate or from a mixture thereof. Silicate solutions may be used in applying both the making coat and the sizing coat or either of these and may also be used in bonding the individual layers of a composite backing.

Improved results may be obtained by applying to the coated article a treatment which will render the silicate adhesive harder, tougher and more resistant to moisture. A convenient and effective treatment which we have used employs the application of heat to the coated article to bring about a loss of water from the silicate.

As an example of a heat-treatment using a baking operation, we have found that good results may be obtained by air-drying the abrasive products coated with a silicate solution such as that previously described for a period of about 18 hours and then subjecting the products to temperatures of 225° F., 260° F., 300° F. for successive periods of 2 hours each. In some cases, lower temperatures and/or shorter baking times should be used to avoid embrittlement.

This heating or baking may be done in an oven or heated chamber of any suitable design. It will be clear that the necessary time of heating and the temperature applied will vary depending upon the characteristics of the silicate adhesive used and the use to which the article is to be put. The proper conditions will be easily determined, however, when it is considered that it is desired to obtain the maximum resistance to humidity and moisture in the silicate film and the maximum service. It is not desirable to have the temperature exceed 300° F. for more than a very short time when cellulosic backings are used.

We have determined that a silicate solution such as the one above mentioned will, after being baked as a film under the conditions specified above, have a moisture content of approximately 20 per cent.

Flexible abrasive articles on which such silicate solutions have been employed as adhesives are entirely satisfactory in use, abrasive discs and belts which we have tested being superior, as determined in an abrading test, in respect to the amount of material removed over a period of several hours, as compared to the stock removal of commercial articles bonded with the usual adhesives.

It is frequently desired to provide an abrasive article which, in addition to resistance to the influence of atmospheric humidity, will also have a resistance to water. We have discovered that a high degree of water resistance can be imparted to our improved silicate bonded flexible abrasive articles by coating the article with a thin film of a protective substance which is preferably waterproof.

This coating may be applied in various ways, as by spraying or brushing the material on the surface of the abrasive article. As an example, we have prepared a thin solution of the protective material and dipped the abrasive article in this solution. A thin uniform coating can easily be obtained in this way. The protective coating may be applied after the baking or, if the protective material is not harmed by the baking temperatures, the coating may be applied before baking.

As examples of protective materials which can be used, there may be mentioned lacquers, varnishes, drying oils, solutions of rubber in organic solvents, latex solutions, solutions of natural and synthetic resins in organic solvents, solutions of gums, waxes, such as paraffine, synthetic wax-like products, such as chlorinated naphthalenes, and organic silicates such as ethyl ortho-silicate.

We have found such synthetic resins as the paracumaroneindene and phenolic-aldehyde condensation product resins to be particularly well-adapted for use in imparting water-resistance to our abrasive articles.

Other resins which may be applied as a protective coating are vinyl resins, such as polyvinyl acetate resins, polyvinyl alcohol-acetal resins, and alkyd resins, which may be modified with oils or fatty acids if desired or convenient.

The coating of the protective material may be very thin, thus lending the silicate film additional resistance to humidity or, by using a somewhat thicker coating, a practically complete resistance to the action of water may be obtained. Such coatings, whether thick or thin, result in substantial absence of any efflorescence of the silicate film due to the action of the carbon dioxide and moisture of the air.

Reduction in the efflorescence of silicate bonded flexible abrasive articles may also be effected by reducing the tendency of the surface to react with the carbon dioxide and moisture of the air. It has been found that soluble silicates of low alkali content do not effloresce as readily as do those of high alkali content. While in some cases low alkali silicates are not as satisfactory as the higher alkali silicates for the making coat in the manufacture of silicate bonded flexible abrasive articles, we have discovered that such silicates may be used satisfactorily for the sizing coat with resultant reduction in efflorescence. We have also determined that potassium silicate is less susceptible to the disfiguration of efflorescence than is sodium silicate and accordingly we may use a film of resistant potassium silicate as a sizing over films of sodium silicate or we may use potassium silicate alone as the adhesive.

In the following examples we describe the manufacture of abrasive discs in accordance with our invention. It is not intended, however, that these examples should be considered other than as exemplary and it will be recognized that not only may the methods set forth for making discs be varied in accordance with our disclosure but that other flexible abrasive articles such as abrasive belts, abrasive paper and cloth sheets and rolls and the like may be produced by similar or appropriately modified methods.

*Example I*

Cloth of the kind ordinarily used in making abrasive cloth is sized with a silicate solution of somewhat less alkalinity than that mentioned in the first portion of this specification. After being air dried the sized cloth and a sheet or web of fiber or paper are combined, using a silicate of good adhesive quality as an adhesive, and then passed through heated calender rolls.

To the thus obtained backing a heavy coat of 36 grit alumina abrasive grain is applied in any suitable way using a making coat of about the alkalinity and specific gravity mentioned in the first portion of this specification, i. e., about 1.68 specific gravity and $Na_2O:SiO_2$ ratio about 1:2, slightly thinned with water if necessary.

A sizing coat of the same type as the making coat but thinner is then applied over the grain and the sheets or webs cured by heating for about 5 hours at temperatures between 150° and 175° F. followed by about 6 hours at about 200° to 225° F.

If desired a mildly reactive filler such as clay may be added to either the making or sizing coats or both to assist in setting up the silicate films. The amount added may range from about 10% to about 40%.

Abrasive discs made according to this example had excellent abrasive qualities with long retained high cutting rate.

*Example II*

Instead of the combination backing used in Example I, a sheet or web of vulcanized fiber about .025 to .03 inch thick is used. A making coat of about 1.7 specific gravity silicate solution having a $Na_2O:SiO_2$ ratio of about 1:2.5 is used and is slightly thinned with water before application to the backing.

After the abrasive grain is applied, a sizing coat of about the same characteristics is applied and the coated sheet or web is cured by being subjected to a temperature of about 125° F. for 12 hours, about 175° F. for 3 hours and about 225° F. for 8 hours.

The abrasive discs made by this method are also excellent.

In connection with the examples given above, it will be realized that preliminary air drying at a low humidity or low temperature heating will reduce the curing time necessary. Furthermore, since to a considerable extent the time and temperatures used in drying the silicate coated articles are interrelated, the time of cure may be shortened by using somewhat higher temperatures. It should be remembered, however, that the cellulosic backings are harmed by too-high temperatures and in general, temperatures above about 250° F. are undesirable.

The physical properties of the coatings may be modified in various ways as, for example, by the addition of flexibilizing agents to the silicate solutions. Among such agents which can be used are polyhydric alcohols such as glycerol, manitol, sorbitol and diethylene glycol, polyhydric alcohol-boric acid resins such as glyceryl or glycol bori-borate, alkaline resin solutions, aqueous emulsions or dispersions of flexible resins, and organic alkalies such as triethanolamine. As will be noted, certain of these flexibility modifying agents also possess adhesive properties and the use thereof will assist in the bonding of the abrasive grains.

Fillers may also be incorporated in our soluble silicate adhesives. The fillers may be inert inorganic ones such, for example, as powdered silica or organic ones such as cellulosic fibers. Particularly good results may be obtained by the use of a highly porous filler such as cork dust with soluble silicate adhesives. Such fillers permit a very slow, gradual breaking away of the dulled abrasive grit so that the cutting rate of the abrasive article is better maintained.

As it is frequently desired to modify the water resistance, activity, hardness and other properties of soluble silicate films reactive materials may be used as agents for this purpose. These materials may be solids, as for example fillers, or they may be liquids, solutions, or solids such as phenol and tannic acid. The latter may also be used in solution if desired.

Among the reactive fillers which may be used are oxides, such as those of zinc, magnesium, boron and those of the alkaline earth metals, hydroxides, such as those of magnesium and the alkaline earth metals, clay, Portland cement and various forms of calcium carbonate. These fillers react with the soluble silicates, producing a thickening and a considerable resistance to the action of water. Such reactive materials may be utilized in various ways depending upon the results desired and the nature of the materials used. A simple and effective way of securing the advantages arising from the use of reactive materials is to merely admix them with the soluble silicate adhesives. This method may be used to advantage with reactive fillers.

We have also found that we can strengthen or reinforce flexible abrasive articles such as discs, by applying to them a coating of a soluble silicate. This coating may be applied to articles bonded with glue, varnish, resin or the like, or to the improved silicate bonded articles of our invention. The reinforcing coating may be applied by any suitable means and may extend over the whole area of the article if desired, though we have found that an annular coating around the periphery of an article such as a disc is productive of improved results. Such a coating may be applied to only one or to both sides of the article and may be of any desired thickness.

By the expression "soluble silicate" as used herein, is meant the water-soluble silicates of the alkali metals. The ones most commonly used are silicates of sodium but we do not wish to be limited to these since all soluble silicates are capable of being used satisfactorily in the practice of our invention.

While we have set forth our invention in some detail and have given a number of examples, we do not wish to be limited thereby except as we are limited by the scope of the appended claims.

This application is a division of co-pending application Serial No. 336,212, filed May 20, 1940, and now abandoned.

We claim:

1. A flexible abrasive sheet for use under conditions developing high abrading surface temperatures comprising a base, a layer of abrading particles spread over the base, an adhesive coat softenable by heat anchoring the abrading particles to the base, and a substantially continuous thin protective film consisting essentially of inorganic material of the alkali metal silicates group united to the adhesive coat, surrounding said particles in general conformity with the surface contours thereof, and forming a seal against exposure of the adhesive coat, said film being of relatively stable consistency and remaining dry and non-sticky at high abrading surface temperatures, thereby materially avoiding the accumulation of dust arising from the abrasion operation on and between the abrading particles irrespective of the softening of said adhesive coat at said high abrading surface temperatures.

2. A flexible abrasive sheet for use under conditions developing high abrading surface temperatures, comprising a sheet base, a layer of abrading particles spread over the base, an adhesive making coat of material of high adhesion qualities, but of relatively unstable consistency becoming sticky at temperatures exceeding 120° F., anchoring the abrading particles to the base, and a substantially continuous thin protective film consisting essentially of inorganic material of the alkali metal silicates group united to the adhesive making coat, surrounding said particles in general conformity with the surface contours thereof, and forming a seal against exposure of the material of the adhesive making coat, said film being of relatively stable consistency remaining dry and non-sticky at temperatures up to 1200° F., whereby, during use of the abrasive sheet under conditions developing heat in excess of 120° F., the abrading surface of said sheet remains substantially dry and non-sticky after said adhesive making coat has become sticky thereby materially avoiding accumulation on said abrading surface of dust arising from the abrasion operation, and substantially prolonging the abrading life of said surface.

3. A flexible abrasive sheet for use under conditions developing high abrading surface temperatures comprising a base, a layer of abrading particles spread over the base, an adhesive making coat of material of high adhesion qualities, but of relatively unstable consistency becoming sticky at temperatures exceeding 120° F., anchoring the abrading particles to the base, and a protective film of substantially uniform thickness comprising an alkali metal silicate united to the making coat, surrounding said particles in general conformity with the surface contours thereof, and forming a seal against exposure of the material of the adhesive making coat, said film being of relatively stable consistency remaining dry and non-sticky at temperatures up to 1200° F., whereby, during use of the abrasive sheet under conditions developing heat in excess of 120° F., the abrading surface of said sheet remains substantially dry and non-sticky even after said adhesive making coat has become sticky thereby materially avoiding accumulation on said abrading surface of dust arising from the abrasion operation, and substantially prolonging the abrading life of said surface.

4. A flexible abrasive sheet for use under conditions developing high abrading surface temperatures comprising a base, a layer of abrading particles spread over the base, an adhesive making coat of material of high adhesion qualities, but of relatively unstable consistency becoming sticky at temperatures exceeding 120° F., anchoring the abrading particles to the base, and a thin protective film of substantially uniform thickness comprising an alkali metal silicate, a filler, and a moisture retaining substance, united to the adhesive making coat, surrounding said particles in general conformity with the surface contours thereof, and forming a seal against exposure of the material of the adhesive making coat, said film being of relatively stable consistency remaining dry and non-sticky at temperatures up to 1200° F. and being relatively hard at such temperatures, whereby said film remains substantially dry and non-sticky at high abrading surface temperatures for materially avoiding accumulation of dust on said abrading surface and also enhancing the abrading qualities of said surface due to the hard film surrounding said abrading particles.

5. An abrasive sheet comprising a base, a making coat applied to the base, a protective coat essentially of water soluble silicate having a low heat conductivity applied over and joined to the making coat, a layer of abradant particles extending into both coats and anchored to the making coat, the protective coat being of heat resisting material of relatively stable consistency, and the making coat being of adhesive material of relatively unstable consistency tending to become soft and sticky with increase in temperature, the protective coat acting to prevent any condition of softness and stickiness from spreading through to the exterior of the sheet adjacent the free ends of the abradant particles and thereby eliminating dust and particle acquisitiveness of the heat softened making coat during use of the abrasive sheet in a dry condition on a dry surface.

6. A flexible abrasive sheet comprising a base, a making coat applied to the base, a protective coat of low heat conductivity and high abradant value applied over and joined to the making coat, a layer of abradant particles extending into both coats and anchored to the making coat, the protective coat comprising silicate of soda, and the making coat comprising glue tending to become soft and sticky with increase in temperature, the protective coat acting to prevent the condition of softness and stickiness from spreading through to the exterior of the sheet adjacent the protruding ends of the abradant particles and thereby eliminating dust and particle acquisitiveness of the heat softened making coat during use of the abrasive sheet in a dry condition on a dry surface.

7. The method of protecting a thermoplastic adhesive making coat of an abrasive sheet which comprises the step of applying over such a making coat a thin protective film of heat-resisting material which will not soften or become tacky at temperatures which otherwise would soften and render the making coat tacky.

8. The method of protecting a thermoplastic adhesive making coat of an abrasive sheet which comprises the step of applying over such a making coat a thin continuous protective film which is relatively resistant to softening, tackiness and disintegration in the presence of mounting temperatures such as would tend to soften and render the making coat tacky whereby to maintain over the making coat a seal to prevent contact therewith of loose foreign particles.

9. A flexible abrasive sheet for use under conditions developing high abrading surface temperatures comprising a base, a layer of abrading particles spread over the base, an adhesive coat softenable by heat anchoring the abrading particles to the base, and a substantially continuous thin protective film consisting essentially of water soluble high ratio silicate of soda united to the adhesive coat, surrounding said particles in general conformity with the surface contours thereof, and forming a seal against exposure of the adhesive coat, said film being of relatively stable consistency and remaining dry and non-sticky at high abrading surface temperatures, thereby materially avoiding the accumulation of dust arising from the abrasion operation on and between the abrading particles irrespective of the softening of said adhesive coat at said high abrading surface temperatures.

10. A flexible abrasive sheet comprising a base, a making coat applied to the base, a protective coat of low heat conductivity and high abradant value applied over and joined to the making coat, a layer of abradant particles extended into both coats and anchored to the making coat, the protective coat comprising high ratio silicate of soda, and the making coat comprising glue tending to become soft and sticky with increase in temperature, the protective coat acting to prevent the condition of softness and stickiness from spreading through to the exterior of the sheet adjacent the protruding ends of the abradant particles and thereby eliminating dust and particle acquisitiveness of the heat softened making coat during use of the abrasive sheet in a dry condition on a dry surface.

11. An abrasive sheet comprising a backing, an adhesive coat applied to the backing, a protective coat essentially of water soluble silicate having a low heat conductivity applied over and joined to the adhesive coat, a layer of abradant particles extending into both coats and anchored to the adhesive coat, the protective coat being of heat resisting material of relatively stable consistency, and the adhesive coat being of adhesive material of relatively unstable consistency tending to become soft and sticky with increase in temperature, the protective coat acting to prevent any condition of softness and stickiness from spreading through to the exterior of the sheet adjacent the free ends of the abradant particles and thereby eliminating dust and particle acquisitiveness of the heat softened making coat during use of the abrasive sheet in a dry condition on a dry surface.

12. An abrasive sheet comprising a backing, a layer of abrasive grains attached to the backing by a thermoplastic adhesive coat, and a coating consisting essentially of a silicate of an alkali metal overlaying the adhesive coat.

13. An abrasive disc comprising a backing, a layer of abrasive grains attached to the backing by a thermoplastic adhesive coat, and a coating consisting essentially of a silicate of an alkali metal overlaying the adhesive coat.

14. A flexible heat-resistant abrasive article of the coated abrasive type comprising a flexible backing, a layer of abrasive grits, and a bond for uniting said grits to said backing, said bond comprising a primary bonding or grit binder coating comprising glue and a secondary or sandsize coat comprising a silicate cement.

15. A flexible heat-resistant abrasive article of the coated abrasive type comprising a flexible backing, a layer of abrasive grits, and a bond for uniting said grits to said backing, said bond comprising a primary bonding or grit binder coating comprising an adhesive material softenable by heat and a secondary or sandsize coat comprising a silicate cement.

16. A flexible heat-resistant abrasive article of the coated abrasive type comprising a flexible backing, a layer of abrasive grits, and a bond for uniting said grits to said backing, said bond comprising a primary bonding or grit binder coating comprising glue, and a secondary or sandsize coat comprising a silicate cement, the silicate cement coating being shielded from air by a protective coating of a waterproofing agent.

17. A heat-resistant abrasive article of the coated abrasive type comprising a backing, a layer of abrasive grits, and a bond for uniting said grits to said backing, said bond comprising a primary bonding or grit binder coating including a hydrophilic organic gelatinous adhesive material and a secondary or sandsize coating comprising a silicate cement, said sandsize coating being shielded from the air by a protective coating of a waterproofing agent.

18. A flexible heat-resistant abrasive article of the coated abrasive type comprising a flexible backing, a layer of abrasive grits, and a bond for uniting said grits to said backing, said bond comprising a primary bonding or grit binder coating comprising glue, and a secondary or sandsize coat comprising a silicate cement having a waterproofing agent incorporated therein to render said cement resistant to air.

19. A heat-resistant abrasive article of the coated abrasive type comprising a backing, a layer of abrasive grits, and a bond for uniting said grits to said backing, said bond comprising a primary bonding or grit binder coating including a hydrophilic organic gelatinous adhesive material and a secondary or sandsize coating comprising a silicate cement, said sandsize coat being rendered resistant to air by inclusion therein of a waterproofing agent.

20. A flexible heat-resistant abrasive article of the coated abrasive type comprising a flexible backing, a layer of abrasive grits, and a bond for uniting said grits to said backing, said bond comprising a primary bonding or grit binder coating comprising glue, and a secondary or sandsize coating comprising a silicate cement treated with a waterproofing agent to shield said cement from air.

21. A heat-resistant abrasive article of the coated abrasive type comprising a backing, a layer of abrasive grits, and a bond for uniting said grits to said backing, said bond comprising a primary bonding or grit binder coating including a hydrophilic organic gelatinous adhesive material and a secondary or sandsize coating comprising a silicate cement, said sandsize coat being treated with an agent to shield the same from air.

22. A flexible heat-resistant abrasive article of the coated abrasive type comprising a flexible backing, a layer of abrasive grits, and a grit binder coating comprising an adhesive material softenable by heat with a protective layer thereover comprising a silicate cement.

NORMAN P. ROBIE.
ALBERT L. BALL.

REFERENCES CITED

The following references are of record in the file of this patent:

UNITED STATES PATENTS

| Number | Name | Date |
|---|---|---|
| 2,278,158 | Ware | Mar. 31, 1942 |